US011669307B2

(12) United States Patent
Alwell (10) Patent No.: US 11,669,307 B2
(45) Date of Patent: Jun. 6, 2023

(54) CODE INJECTION FROM NATURAL LANGUAGE DERIVED INTENT

(71) Applicant: Microsoft Technology Licensing, LLC, Redmond, WA (US)

(72) Inventor: Kevin John Alwell, Colts Neck, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 17/244,905

(22) Filed: Apr. 29, 2021

(65) Prior Publication Data

US 2022/0350574 A1 Nov. 3, 2022

(51) Int. Cl.
*G06F 8/33* (2018.01)
*G06F 40/40* (2020.01)
*G06F 3/16* (2006.01)
*G10L 15/26* (2006.01)

(52) U.S. Cl.
CPC ............. *G06F 8/33* (2013.01); *G06F 3/16* (2013.01); *G06F 40/40* (2020.01); *G10L 15/26* (2013.01)

(58) Field of Classification Search
None
See application file for complete search history.

(56) References Cited

U.S. PATENT DOCUMENTS

| 8,898,630 | B2 | 11/2014 | Hirsch et al. | |
| 2003/0163323 | A1* | 8/2003 | Bluvband | G06F 8/73 |
| | | | | 704/E15.045 |
| 2006/0106608 | A1* | 5/2006 | Weinmeister | G10L 15/26 |
| | | | | 704/E15.045 |
| 2016/0357519 | A1* | 12/2016 | Vargas | G06F 40/40 |
| 2018/0275957 | A1* | 9/2018 | Chavali | G06F 16/635 |
| 2019/0391792 | A1* | 12/2019 | Sabharwal | G06N 3/08 |
| 2020/0026488 | A1* | 1/2020 | Yoon | G06F 3/167 |

OTHER PUBLICATIONS

"WebSocket", Retrieved from: https://en.wikipedia.org/w/index.php?title=WebSocket&oldid=838373221, Apr. 26, 2018, 8 Pages.
"International Search Report and Written Opinion Issued in PCT Application No. PCT/US22/023389", dated Jun. 30, 2022, 12 Pages.
"Voicecode", Retrieved From: https://web.archive.org/web/20141029202158/https:/www.voicecode.io/, Oct. 29, 2014, 3 Pages.
"We're Rethinking Programming", Retrieved From: https://web.archive.org/web/20201030072200if_/https:/serenade.ai/company/, Oct. 30, 2020, 2 Pages.

(Continued)

*Primary Examiner* — Isaac Tuku Tecklu
(74) *Attorney, Agent, or Firm* — Workman Nydegger (57) ABSTRACT

An intent broker component that is configured to facilitate the use of voice to develop code in a source code editor. This is accomplished by using intent parameters that are generated by a natural language processor in response to receiving verbal input from a developer operating with the source code editor. These intent parameters includes an action name and a parameter upon which to perform the named action. The intent parameters are then used to generate input to a code injection component that operates in the source code editor.

20 Claims, 6 Drawing Sheets

(56) References Cited

OTHER PUBLICATIONS

Arnold, et al., "Programming by Voice, VocalProgramming", in Proceedings of the Fourth International ACM Conference on Assistive Technologies, Nov. 13, 2000, pp. 149-155.

Cassel, David, "Perl Programmer Pioneers Coding by Voice", Retrieved From: https://thenewstack.io/perl-programmer-pioneers-coding-by-voice/, Jun. 30, 2019, 18 Pages.

Comeau, Joshua, "Hands-Free Coding", Retrieved From: https://web.archive.org/web/20201119202525/https:/www.joshwcomeau.com/blog/hands-free-coding/, Nov. 19, 2020, 9 Pages.

Desilets, Alain, "VoiceGrip: A Tool for Programming-by-Voice", in International Journal of Speech Technology, vol. 4, Issue 2, Jun. 2001, pp. 103-116.

Nikam, et al., "Voice Recognition Scheme for Coding Console Using Natural Language Processing—a Survey", in International Journal of Engineering Research in Computer Science and Engineering, vol. 5, Issue 3, Mar. 2018, pp. 326-330.

Wengel, Gustav, "Programming by Voice in 2019", Retrieved From: https://blog.logrocket.com/programming-by-voice-in-2019-3e1855f5add9/, Apr. 15, 2019, 10 Pages.

\* cited by examiner

CODE INJECTION FROM NATURAL LANGUAGE DERIVED INTENT

BACKGROUND

Computing systems operate in response to the execution of computer-executable instructions or "code". Code is often originally authored in source code by one or more computer programmers using a source code language that is intuitive to a programmer. An integrated development environment (IDE) is a software application that provides a computing environment in which computer programmers can more easily develop software. An IDE normally consists of a source code editor, build automation tools and a debugger. The source code editor allows the software developer to create and edit the source code of a software project under development.

The source code editor typically has an auto-complete or auto-suggest capability which anticipates from previous typing what the developer may be trying to type. If the suggestions is truly what the developer is trying to type, then the developer can simply select the suggestion, rather than complete typing. This saves the developer time, as well as reduces the risk of error during typing.

There are some conventional solutions for allowing source code to be input using voice. Such voice input allows for the developer to use voice-dictation to input the code instead of typing that code. This may be awkward if the voice-dictation tools do not account for unique format and structural characteristics of source code—such as nesting, pointers, underscores to connect words, and so forth. Accordingly, several conventional solutions allow for more efficient dictation of the code.

Such conventional solutions are the result of careful analysis of how voice commands could be ambiguously interpreted and provide new tools (e.g., reserved words that are not to be interpreted literally) to reduce the chance of ambiguous interpretation. As an example, the word "kabob" might be a reserved word that is not to be interpreted literally, but rather as an instruction to insert an underscore character. Thus, speaking "player kabob new" would result in "player_new" being input into the source code editor. Thus, with proper training on the tools available, literal forms of the code can be spoken instead of typed for efficient input of code into a source code editor. Such a solution is a great aid to those who might suffer from too much use of the keyboard or mouse, such as those that suffer from repetitive strain injury.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to an intent broker component that is configured to facilitate the use of voice to develop code in a source code editor, such as in an integrated development environment. This is accomplished by using intent parameters that are generated by a natural language processor in response to receiving verbal input from a developer operating with a source code editor. These intent parameters include an action name and a parameter upon which to perform the named action. The intent parameters are then used to generate input to a code injection component that operates in the source code editor.

This code injection can occur with little lag between the time that the code is spoken by the developer and the time that the code is injected into the source code editor. This may be accomplished by having a web socket operating on the developer's client computing system, and then having cloud computing components subscribe to that web socket. The natural language processor can operate within the cloud thereby allowing the intent parameters to be quickly generated. The preparation of the code injection component input and the code injection component itself may operate in the cloud, or perhaps back on the client computing system. Regardless, the return of the appropriate information may also happen quickly using the web socket. Thus, the developer speaks the code, whilst very shortly thereafter the code is inserted (or at least suggested)—in relative real-time.

The verbal commands need not be exact, but need only express the appropriate intent, and thus the user may speak normally. Meanwhile, the code injection component inserts the appropriate code given the context of the code development project. This allows a sort of smart autocomplete of code in real-time, thereby providing a substantial improvement in the art of software development for all, and particularly for those whose ability to type or manipulate a pointer device is impeded.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein relate to an intent broker component that is configured to facilitate the use of voice to develop code in a source code editor, such as in an integrated development environment. This is accomplished by using intent parameters that are generated by a natural language processor in response to receiving verbal input from a developer operating with a source code editor. These intent parameters include an action name and a parameter upon which to perform the named action. The intent parameters are then used to generate input to a code injection component that operates in the source code editor.

This code injection can occur with little lag between the time that the code is spoken by the developer and the time that the code is injected into the source code editor. This may be accomplished by having a web socket operating on the developer's client computing system, and then having cloud computing components subscribe to that web socket. The natural language processor can operate within the cloud thereby allowing the intent parameters to be quickly generated. The preparation of the code injection component input and the code injection component itself may operate in the cloud, or perhaps back on the client computing system. Regardless, the return of the appropriate information may also happen quickly using the web socket. Thus, the developer speaks the code, whilst very shortly thereafter the code is inserted (or at least suggested)—in relative real-time.

The verbal commands need not be exact, but need only express the appropriate intent, and thus the user may speak normally. Meanwhile, the code injection component inserts the appropriate code given the context of the code development project. This allows a sort of smart autocomplete of code in real-time, thereby providing a substantial improvement in the art of software development for all, and particularly for those whose ability to type or manipulate a pointer device is impeded.

Figure 1:
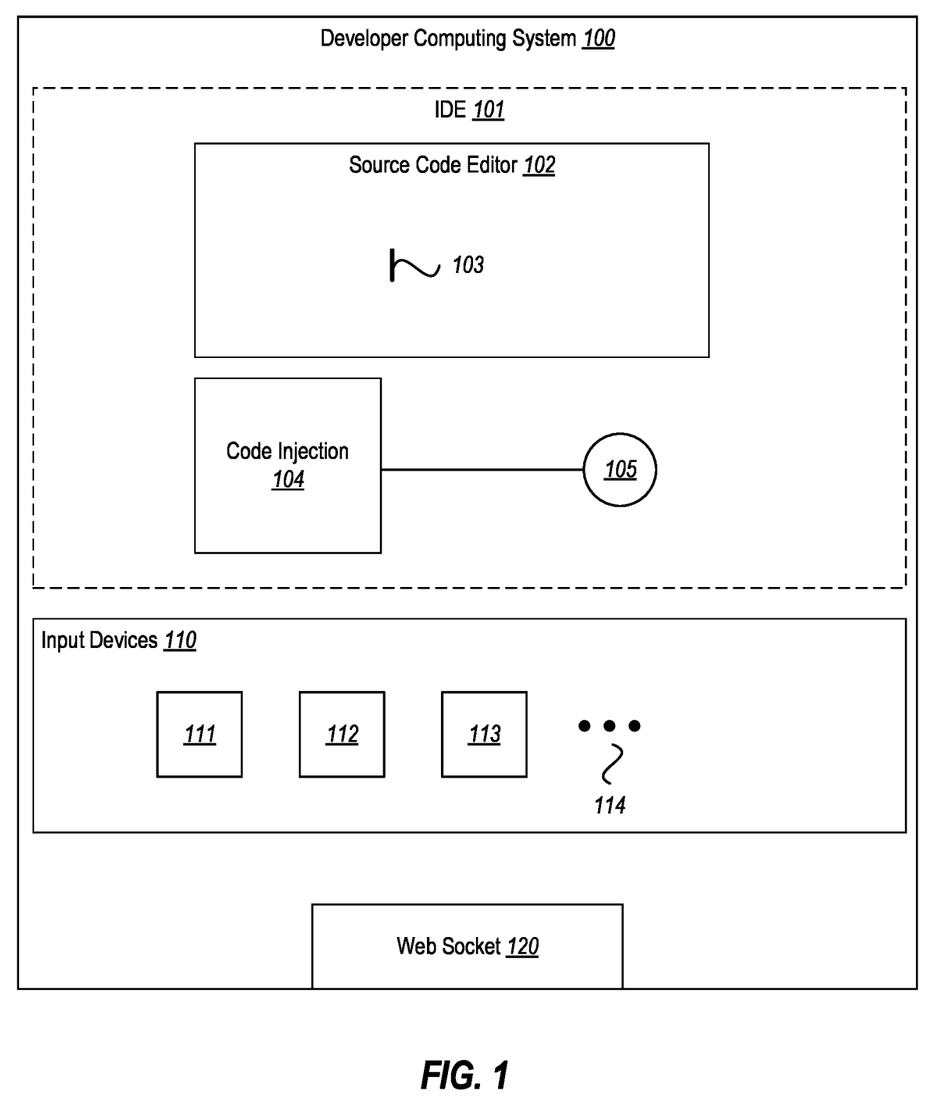
FIG. 1 illustrates a developer computing system that includes a source code editor and associated voice input and code injection components in accordance with the principles described herein.

FIG. 1 illustrates a developer computing system 100 in accordance with the principles described herein. As an example, the developer computing system may be structured as described below for the computing system 600 of FIG. 6. The developer computing system 100 includes a source code editor 102 that a software developer can use to generate source code. Specifically, the software developer generates source code by inputting text into the source code editor 102. At any given time, the source code editor 102 has an edit point 103 that represents a point at which text will be inserted should the developer choose to insert text. The developer can move the edit point 103 to thereby select where the developer is going to insert new text into the source code under development. Although not required, the source code editor 102 may be part of an integrated development environment 101.

A code injection component 104 operates in the source code editor 102 in the sense that the code injection component 104 may automatically insert code at wherever the edit point 103 is in the source code editor 102. Alternatively, instead of automatically inserting code, the code injection component 104 may provide a suggestion of code that the developer can select to cause the suggested code to actually be inserted at the edit point 103.

The code injection component 104 has knowledge of the context 105 of the source code under development, and can present suggestions that take into consideration the context that exists at the edit point 103. As an example, the code injection component 104 has knowledge of the names of variables and functions that are defined and available for use at the corresponding edit point 103. The code injection component 104 also has knowledge of the data model of the program at that edit point, and the schema of input and output parameters for functions. Thus, a user may begin typing the name of a function, and the code injection component can auto-suggest the function.

The developer computing system 100 also has input devices 110 that the developer can use to move the edit point 103 around and to input source code at the edit point 103. These input devices 110 include input devices 111, 112, and 113, although the ellipsis 114 represents that the developer computing system 100 could include any number if input devices. If the developer computing system 100 is structured as described below for the computing system 600 of FIG. 6, the input devices 110 may be the input mechanisms 612B. As an example, the input device 111 could be a keyboard, while the input devices 112 could be a mouse or other pointer device. However, in accordance with the principles described herein, the input device 113 is a voice input mechanism.

The developer computing system 100 also has thereon a web socket 120. In this description, a "web socket" is an executable component to which data can be published, and that a web service can subscribe to. When data is published into the web socket 120, the data is automatically provided to any web service that subscribes to the web socket 120. This will be helpful as described herein in order to allow for auto-suggest or auto-completion of code in the source code editor 102 based on voice input. If this auto-suggest or auto-complete happens quickly, it remains relevant and helpful to the user. If too much time elapses, the developer might more likely have completed the text manually, or moved on to another portion of the source code, rendering the auto-suggestion unhelpful in assisting in the generation of the source code.

Figure 2:
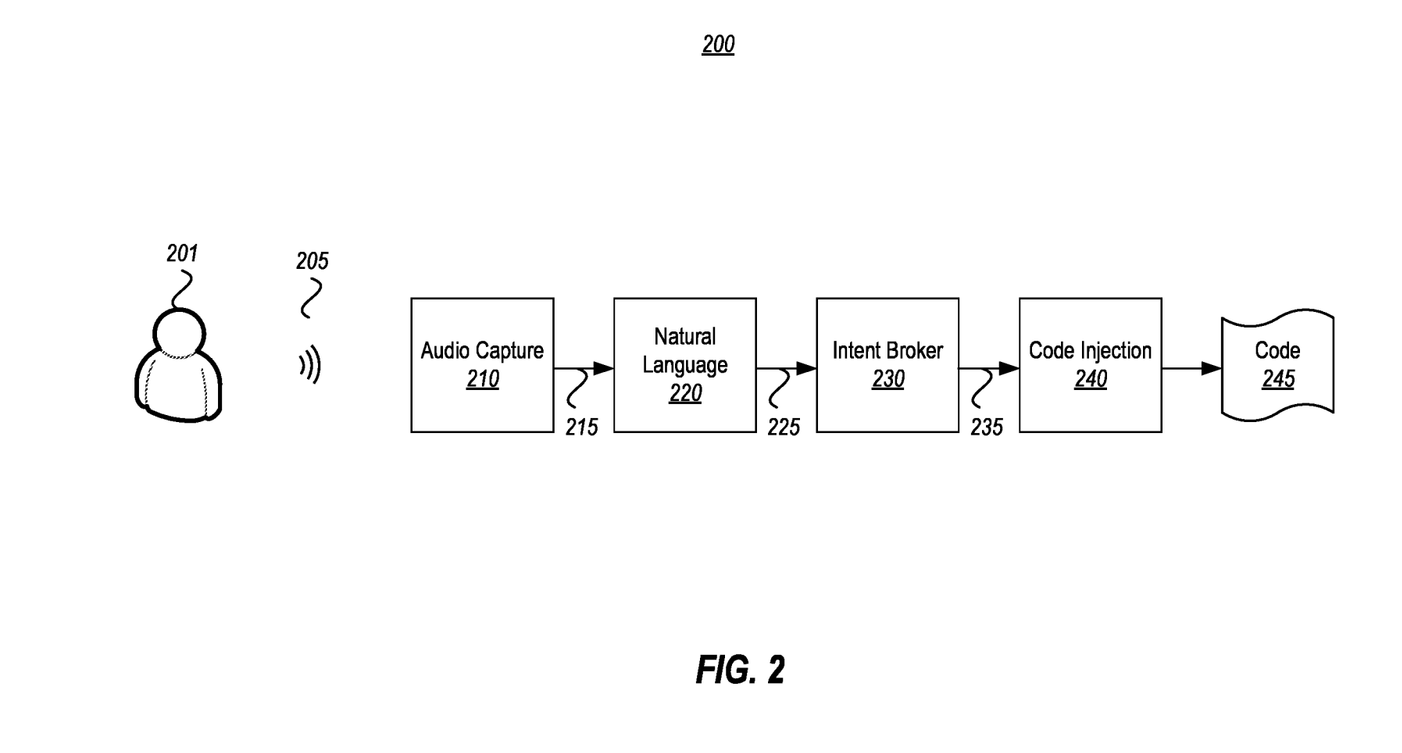
FIG. 2 illustrates an example data flow associated with the use of voice to quickly generate code, in accordance with the principles described herein.

FIG. 2 illustrates an example data flow 200 associated with the use of voice to quickly generate code. The data flow 200 helps the user insert code into a source code editor at the corresponding edit point. As an example, in FIG. 1, the data flow 200 may be used to allow the developer to speak code for insertion at the edit point 103 of the source code editor 102. The example data flow 200 thus is an example data flow that may be performed by the voice input mechanism 113 of FIG. 1.

The data flow 200 begins with the user 201 speaking 205 with a voice into the audio capture component 210. The audio capture component 210 converts the voice into an audio file 215 and provides the audio file to a natural language processor 220. The natural language processor 220 derives intent parameters 225 from the audio file 215, and provides those intent parameters 225 to an intent broker component 230. The intent broker component 230 processes the intent parameters 225 and generates code injection input 235 that is reflective of the intent parameters 225 but yet complies with the input expected by the code injection component 240. The code injection component 240 then uses its knowledge of the context of the present edit point in the source code editor to thereby generate appropriate code 245.

That code 245 is then suggested to the developer via the source code editor for possible selection and insertion at the edit point. Alternatively, the code 245 is actually automatically populated into the source code editor at the corresponding edit point. Thus, the user is able to use their voice, speaking in natural language, to quickly and efficiently generate corresponding code. The user need not make any special effort to learn how to speak code specifically, but can simply convey enough information that the natural language processor can sufficiently derive the developer's intent.

The audio capture component 210, the natural language processor 220, the intent broker 230 and the code injection component 240 may each be structured as described below for the executable component 606 of FIG. 6. To allow for fast real-time processing, executable components that have higher computing power requirements are performed in the cloud (i.e., in a cloud computing environment).

As an example, in one embodiment, the audio capture component 210 may operate upon the developer computing system (e.g., developer computing system 100 of FIG. 1). For instance, the natural language processor may be a natural language processing service performed in a cloud computing environment. In that case, the web socket 120 may be used to communicate the audio file from the audio capture component 210 to the natural language processing service in the cloud.

The intent broker component 230 may also be implemented as a service in a cloud computing environment, or perhaps may be a component on the developer computing system itself, or combinations thereof. If the intent broker component 230 is a component on the developer computing system, the same web socket that was used to communicate the audio file to the natural language processor 220 can be used to communicate the intent parameters from the natural language processor 220 back to the intent broker component 230 on the developer computing system.

The code injection component 240 may also be implemented as a service in a cloud computing environment, or perhaps may be a component on the developer computing system itself. If implemented as a cloud service, the code injection component 240 may use the web socket 120 to communicate the code back to the editor 102. On the other hand, if the code injection component 240 is a component on the developer computing system, the same web socket that was used to communicate the audio file to the natural language processor 220 can be used to communicate the code injection input back from the intent broker component 230 to the code injection component on the developer computing system.

Therefore, the web socket can be used to bifurcate high power processing that may be more beneficially processed in the cloud, from processing that may be beneficially implemented on the developer computing system. This allows for the data flow 200 to be executed quickly. The dataflow 200 completes when the source code editor 102 remains at or close to the edit point 103 that existed at the time the dataflow began. Thus, auto-completion and auto-suggestion of the code 245 remains relevant and helpful to the developer.

Figure 3:
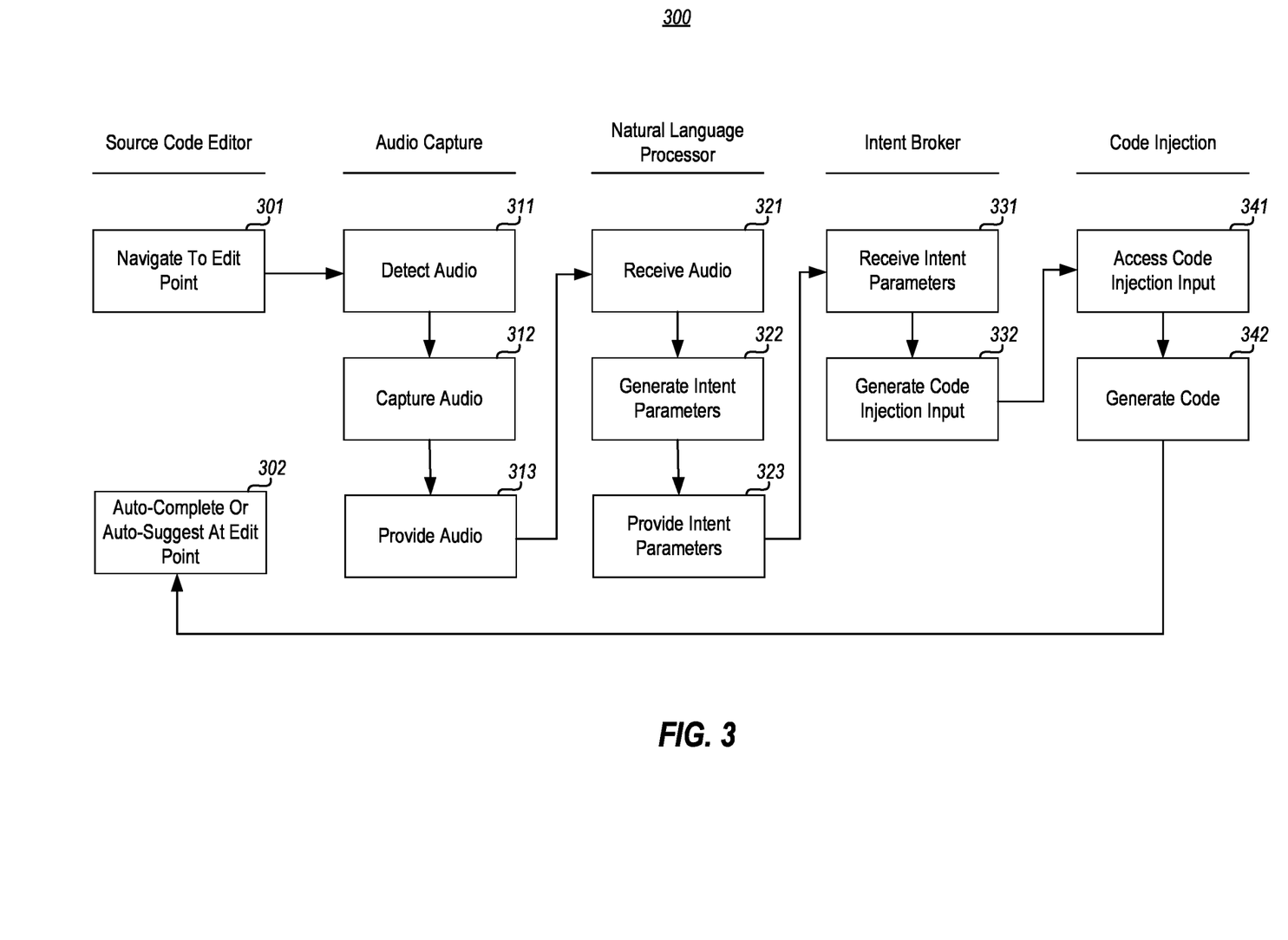
FIG. 3 illustrates a flowchart of a method for using voice to develop code in a source code editor in accordance with the principles described herein.

FIG. 3 illustrates a flowchart of a method 300 for using voice to develop code in an integrated development environment in accordance with the principles described herein. Some of the acts performed by the method 300 are performed by the source code editor 102, some by the audio capture component 210, some by the natural language processor 220, some by the intent broker component 230, and some by the code injection component 240, as reflected under the appropriate underlined headers arrayed in FIG. 3 from left to right.

The method 300 begins and ends at the source code editor, such as the source code editor 102 of FIG. 1. This is because the developer speaks while the source code editor is open and the developer is actively speaking, and the auto-suggestion or auto-completion occurs within the source code editor environment. The method 300 may be repeated any number of times, whenever the developer speaks so that his/her voice is captured by the audio capture component. Nevertheless, one performance of the method 300 will now be described with respect to several examples. In a first example called herein a "comment" example, the user speaks "put a comment here that says 'this section is for test purposes only'". In a second example called herein a "define" example, the user speaks "Define a function here called 'navigate' that receives the same parameters as the 'skip' function, except for the name parameter". These are example natural language phrases in which the developer issues natural instructions.

The method 300 occurs in the context of the developer having navigated to an edit point in the source code editor (act 301). The principles described herein are not limited to a particular edit point within the source code editor. However, whatever that edit point is, the code injection component will provide a suggestion or completion of code that takes into proper consideration the context of the program at the editor point. In the example of FIG. 1, the user has navigated to the edit point 103 within the source code editor 102. However, method 300 may be repeated any number of times at varying edit points within the source code editor as the developer engages with development of their source code.

While the source code editor is at that particular edit point (e.g., edit point 103 of the source code editor 102), the audio capture component detects audio (act 311). This audio capture component may be the audio capture component 210 of FIG. 2. The developer (e.g., developer 201) may be in control of when the audio capture component picks up audio, and when it does not. For instance, the developer might activate a control when the audio capture component is to capture audio, and deactivate the control when the audio capture component is to no longer capture audio. Alternatively, or in addition, the audio capture component may recognize the voice of the developer, and thus automatically begin capture upon detecting the voiceprint of the developer.

The audio capture component then captures the audio in an audio file (act 312), and further provides that audio file to a natural language processor (act 313). If the natural language processor is implemented in a cloud computing environment, the audio capture component may publish the audio file to the web socket that the natural language processors subscribed to, causing the audio file to be quickly provided to the natural language processor. For instance, in FIG. 2, in order for the audio capture component 210 to provide (as represented by arrow 215) the audio file to the natural language processor 220, the audio capture component may publish the audio file to the web socket (e.g., web socket 120) of the developer computing system 100. Thus, powerful cloud-based natural language processors may be used to derive intent from the audio file (or in other words, from what the developer said).

The natural language processor obtains the audio from the audio capture component (act 321). As an example, in FIG. 2, the natural language processor 220 obtains (as represented by arrow 215) the audio from the audio capture component 210. The natural language processor then generates multiple intent parameters based on that audio (act 322), and provides those intent parameters to an intent broker component (act 323). As an example, in FIG. 2, the natural language processor 220 provides (as represented by arrow 225) the intent parameters to the intent broker component 230.

The intent broker component is configured to facilitate the use of voice to develop code in the source code editor using the intent parameters received from the natural language processor. Referring to FIG. 3, the intent broker component receives the intent parameters from the natural language processor (act 331). Referring to FIG. 2 as an example, the intent broker component 230 receives (as represented by arrow 225) the intent parameters from the natural language processor 220. As an example, the intent parameters could include an action name and a parameter upon which to perform an action identified by the action name.

For instance, in the "comment" example, the user speaks "put a comment here that says 'this section is for test purposes only'". Here, the intent parameters could thus be an action "insert comment" with the input string parameter "This section is for text purposes only." In "define" example, the user speaks "Define a function here called 'navigate' that receives the same parameters as the 'skip' function, except for the name parameter". The intent parameters could include the action "define function" along with a function name "Navigate" and with "Parameters: same as skip, except 'name'".

The intent broker component then uses the intent parameters provided by the natural language processor in order to generate input for the code injection component (act 332). As an example, in FIG. 2, the intent broker component 230 receives the intent parameters (as represented by arrow 225) from the natural language processor 220, generates input for the code injection component, and provides that code injection input (as represented by the arrow 235) to the code injection component 240. Thus, the intent broker component 230 serves to translate intent parameters output by the natural language processor 220 into appropriate input for the code injection component 240.

Referring to FIG. 3, the code injection component receives the inputs generated by the intent broker component 230 (act 341), and generates corresponding code (act 342). This generation is based on the context of the source code editor, which the code injection component is aware of. For example, recall that the intent parameters for the "define" example included "Parameters: same as skip, except 'name'". This is provided in appropriate form for the code injection component (after translation by the intent broker component". And since the code injection component knows that the skip function includes parameters "id, name, count, and type", the code injection component auto-suggests the define function with appropriate parameters "id", "count" and "type". Alternatively, the code broker component may also have awareness of the context of the source code editor. Perhaps then the intent broker component informed the code injection component that the parameters were to be "id", "count" and "type".

The code injection component then auto-completes at the edit point within the source code editor (e.g., at the edit point 103 in the source code editor 102 of FIG. 1), or auto-suggests at the edit point within the source code editor (act 302). In the case of an auto-suggest, the developer may be presented with the code generated in act 342 and may be given the option to accept that code into the source code editor.

Thus, the developer inserts code by speaking general intent into an audio capture component, and with code automatically generated and populated or suggested to the user quickly while the developer is still operating at the edit point within the source code editor.

Figure 4:
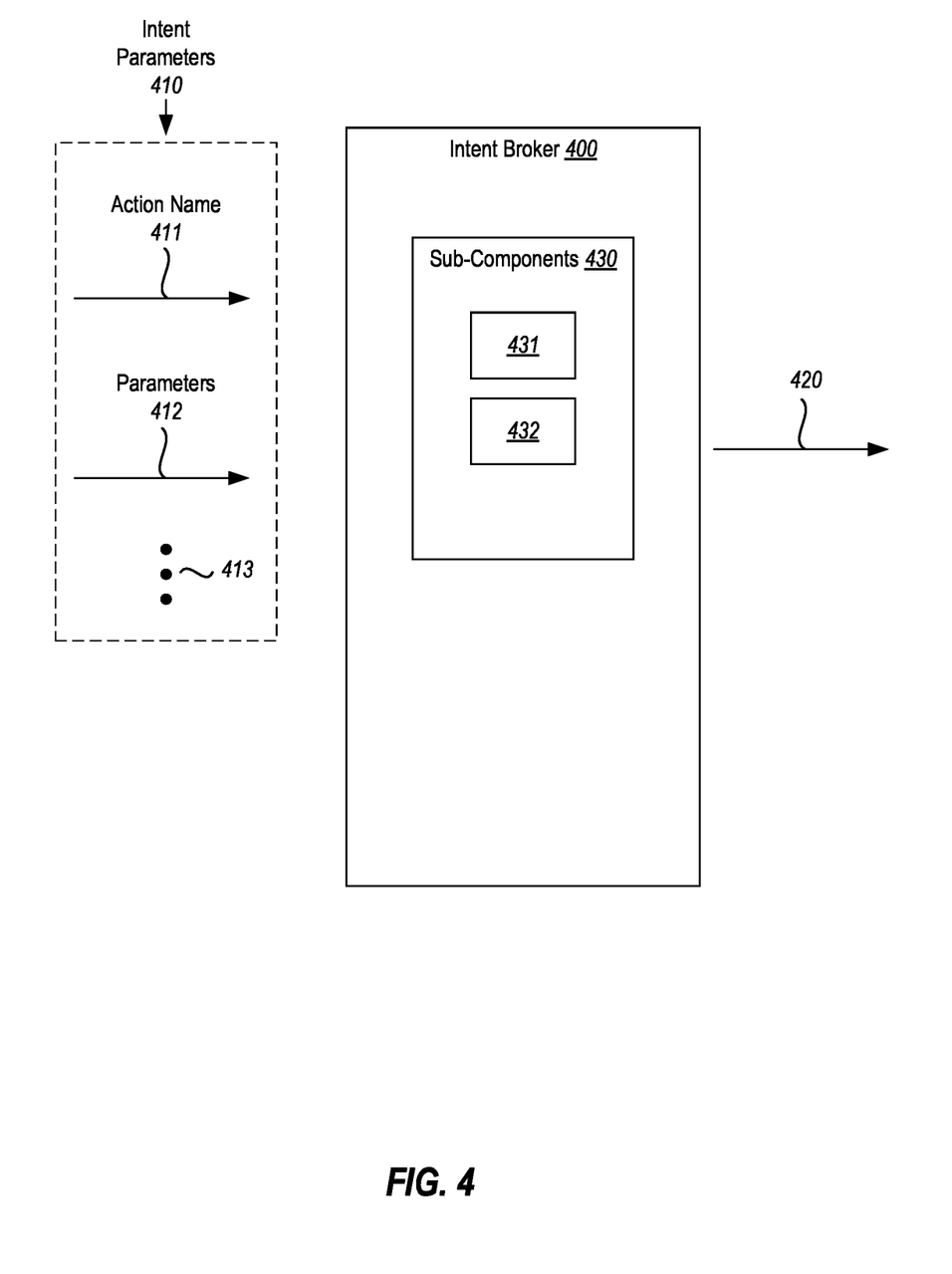
FIG. 4 illustrates an intent broker component, which represents an example of the intent broker component of FIG. 2.

FIG. 4 illustrates an intent broker component 400, which represents an example of the intent broker component 230 of FIG. 2. Here, the intent broker component 400 receives the intent parameters 410 that were generated by the natural language processor (e.g., by the natural language processor 220 of FIG. 2). The intent parameters 410 includes an action name 411, parameter(s) 412 as well as other potential intent parameters as represented by the ellipsis 413. In this embodiment, the intent broker component 400 uses different sub-components to generate the code injection input 420 for the code injection component (e.g., the code injection component 240 of FIG. 2) depending on the action name 411. As an example, if the action name 411 had one value (i.e., a "first" action name), then the intent broker component 400 may use a first sub-component 431 of a group 430 of sub-components to generate the input 420. If the action name 412 had another value (i.e., a "second" action name), then the intent broker component 400 may use a second sub-component 432 of the group 430 to generate the input 420.

Figure 5A:
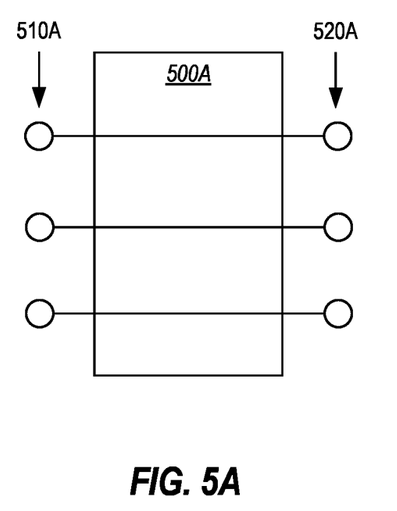
FIG. 5A illustrates a first sub-component that passes the intent parameters along as output for input to the code injection component.

In one example, the first sub-component 421 simply passes the intent parameters 410 along as output 420. For example, FIG. 5A illustrates a component 500A that passes the input parameters 510 directly as output 520 without change. This may be appropriate where the intent parameters generated by the natural language component are already in the proper form to be consumed by the code injection component. If the action name were a "define" action, the intent parameters generated by the natural language processor may also include a parameter and one or more arguments of the function. In this case, the code injection component would already know how to generate code directly from these intent parameters. The code insertion component would thus insert or offer to insert the code that has the defined function with the arguments.

Figure 5B:
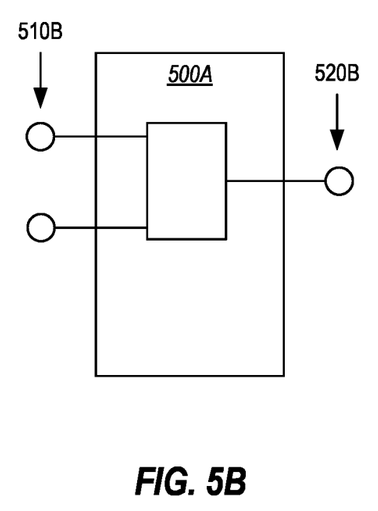
FIG. 5B illustrates a second sub-component that processes the intent parameters to generate input for the code injection component.

On the other hand, the second sub-component 500B of FIG. 4 uses component 530 to generate input 520B that is at least partially different from the plurality of intent parameters 510B, and passes that input 520B to the code injection service. This is appropriate where the intent parameters generated by the natural language component are not yet in proper form to be consumed by the code injection component. If the action name were a "comment" action, for instance, the intent parameters generated by the natural language processor may also include an action name of "insert comment" as well as a parameter "This section is for test purposes only". In that case, perhaps the code injection component needs the input to be in a different form such as "Comment: This section is for test purposes only" in order to generate the code / This section is for test purposes only .

Different sub-components 430 may thus be specially suited to perform the correct transformation. Thus, the intent broker 400 properly brokers intent parameters generated by the natural language component into proper form to be consumed by the code injection component associated with the source code editor.

Accordingly, the principles described herein allow for the use of a developer's voice expressing natural language in order to generate code within a source code editor. Because the principles described herein are performed in the context of a computing system, some introductory discussion of a computing system will be described with respect to FIG. 6.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
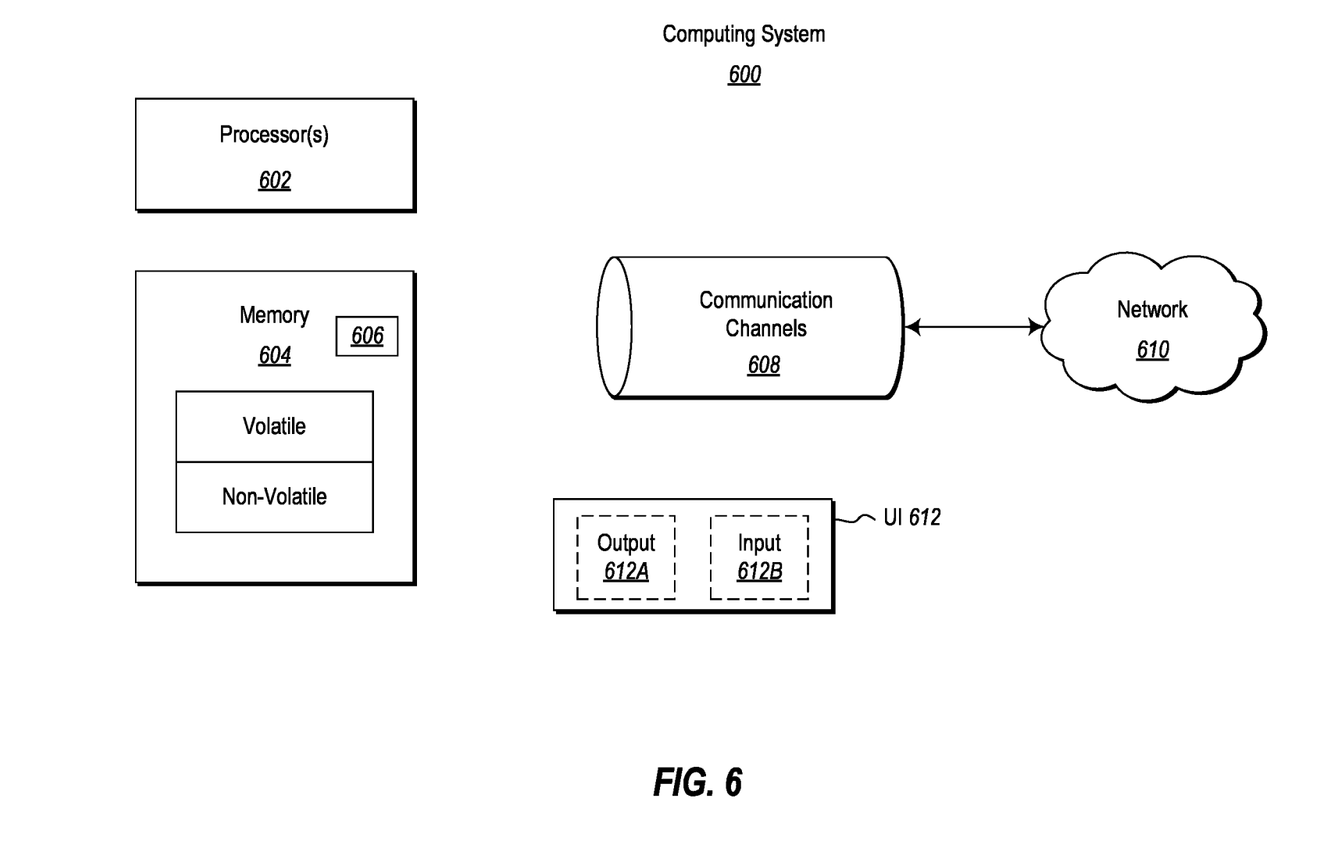
FIG. 6 illustrates an example computing system in which the principles described herein may be employed.

As illustrated in FIG. 6, in its most basic configuration, a computing system 600 includes at least one hardware processing unit 602 and memory 604. The processing unit 602 includes a general-purpose processor. Although not required, the processing unit 602 may also include a field programmable gate array (FPGA), an application specific integrated circuit (ASIC), or any other specialized circuit. In one embodiment, the memory 604 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 600 also has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface system 612 for use in interfacing with a user. The user interface system 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, virtual or augmented reality, holograms and so forth. Examples of input mechanisms 612B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system that facilitates use of voice input to develop code in a source code editor, the computing system comprising:
    at least one processor; and
    at least one hardware storage device that stores instructions that are executable by the at least one processor to cause the computing system to:
        obtain a plurality of intent parameters generated by a natural language processor, the plurality of intent parameters including an action name and a parameter for an action identified by the action name; and
        use the plurality of intent parameters to generate input to a code injection component that operates in a source code editor so that the code injection component generates output in the source code editor, wherein generating the output in the source code editor includes:
            determining an edit point in the source code editor, the source code editor comprising source code, the edit point being a point in the source code where one or more coding features are permitted to be entered;
            determining a context for the source code at the edit point, wherein the context includes information about a coding feature that is available for use at the edit point but that might not otherwise be available for use at a different edit point in the source code such that the context is end point specific context;
            based on the end point specific context that currently exists at the edit point within the source code, displaying, at the edit point in the source code, the coding feature as an auto-suggested feature; and receiving a voice input command that accepts the coding feature such that the coding feature is incorporated into the source code at the edit point.

2. The computing system in accordance with claim 1, the output comprising autocomplete options within the source code editor.

3. The computing system in accordance with claim 1, the instructions being further executable to cause to the computing system to:

obtain audio from an audio capture component that captures audio of a developer operating in the source code editor; and generate the plurality of intent parameters.

4. The computing system in accordance with claim 3, the natural language component being executed in a cloud computing environment, the natural language component obtaining the audio from the audio capture component by subscribing to a web socket that is running on a developer computing system that is running the source code editor.

5. The computing system in accordance with claim 1, wherein using the plurality of intent parameters to generate the input to the code injection component comprises passing the intent parameters directly as input to the code injection component.

6. The computing system in accordance with claim 1, the action name comprising a comment action, the parameter including text to include in a comment, the output in the source code editor including an insertion or offering to insert of the comment that includes the text.

7. The computing system in accordance with claim 1, the action name comprising a define action, the parameter including a function name of a function and one or more arguments of the function, the output in the source code editor including an insertion or offering to insert new source code that defines the function with the one or more arguments.

8. The computing system in accordance with claim 1, wherein:

the action name is one of a first action name or a second action name, in response to the action name being the first action name, the broker component passes the plurality of intent parameters to the code injection component, and in response to the action name being the second action name, the intent broker component generates input that is at least partially different from the plurality of intent parameters, and passes that input to the code injection component.

9. The computing system in accordance with claim 1, wherein:

the action name is one of a first name or a second action name, in response to the action name being the first action name, the intent broker component selects a first sub-component to provide the input to the code injection component, and in response to the action name being the second action name, the intent broker component selects a second sub-component to provide the input to the code injection component.

10. A method for facilitating use of voice input to develop code in a source code editor, the method performed by an intent broker component that operates between a natural language processor and a code injection component, the method comprising:

obtaining a plurality of intent parameters generated by the natural language processor, the plurality of intent parameters including an action name and a parameter for an action identified by the action name; and using the plurality of intent parameters to generate input to the code injection component that operates in the source code editor so that the code injection component generates output in the source code editor, wherein generating the output in the source code editor includes:

determining an edit point in the source code editor, the source code editor comprising source code, the edit point being a point in the source code where one or more coding features are permitted to be entered;

determining a context for the source code at the edit point, wherein the context includes information about a coding feature that is available for use at the edit point but that might not otherwise be available for use at a different edit point in the source code such that the context is end point specific context;

based on the end point specific context that currently exists at the edit point within the source code, displaying, at the edit point in the source code, the coding feature as an auto-suggested feature; and receiving a voice input command that accepts the coding feature such that the coding feature is incorporated into the source code at the edit point.

11. The method in accordance with claim 10, the output comprising autocomplete options within the source code editor.

12. The method in accordance with claim 11, further comprising the following performed by the natural language processor:

obtaining audio from an audio capture component that captures audio of a developer operating in the source code editor; and generating the plurality of intent parameters.

13. The method in accordance with claim 10, wherein using the plurality of intent parameters to generate the input to the code injection component comprises passing the intent parameters directly as input to the code injection component.

14. The method in accordance with claim 10, the action name comprising a comment action, the parameter including text to include in a comment, the output in the source code editor including insertion or offering to insert the comment that includes the text.

15. The method in accordance with claim 10, the action name comprising a define action, the parameter including a function name of a function and one or more arguments of the function, the output in the source code editor including insertion or offering to insert new source code that defines the function with the one or more arguments.

16. A computer system that facilitates use of voice input to develop code in a source code editor, the computer system comprising:

at least one processor; and at least one hardware storage device that stores instructions that are executable by the at least one processor to cause the computer system to:

determine an edit point in a source code editor, the source code editor comprising source code, the edit point being a point in the source code where one or more coding features are permitted to be entered;

determine a context for the source code as the context exists up to and including the edit point, wherein the context includes information about a coding feature that is available for use at the edit point but that might not otherwise be available for use at a different edit point in the source code such that the context is end point specific context;

display, at the edit point in the source code, the coding feature as an auto-suggested feature, wherein determining which coding feature to display is predicated on the end point specific context; and receive a voice input command that accepts the coding feature such that the coding feature is incorporated into the source code at the edit point.

17. The computer system of claim 16, wherein the end point specific context describes at least one of a variable in the source code or a function in the source code.

18. The computer system of claim 16, wherein the end point specific context describes a data model of a program at the edit point.

19. The computer system of claim 16, wherein the end point specific context describes a schema of an input or output parameter for a function.

20. The computer system of claim 16, wherein the end point specific context describes a name of a variable that is available for use at the edit point.

\* \* \* \* \*